Patented July 1, 1924.

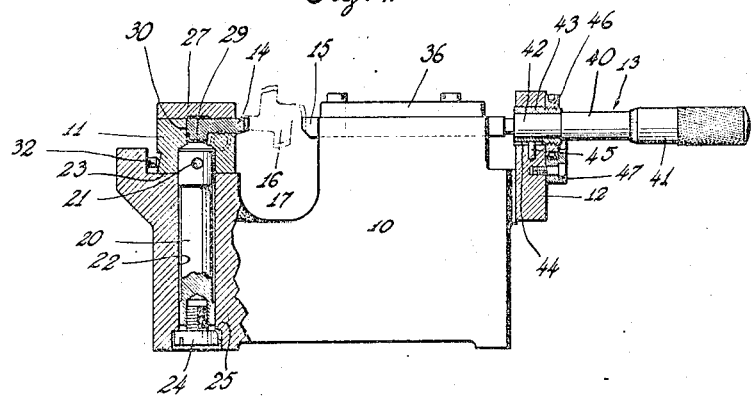

1,499,729

UNITED STATES PATENT OFFICE.

BENGT M. W. HANSON, OF HARTFORD, CONNECTICUT.

SCREW-THREAD-GAUGE DEVICE.

Application filed May 21, 1923. Serial No. 640,349.

*To all whom it may concern:*

Be it known that I, BENGT M. W. HANSON, a citizen of the United States, and a resident of Hartford, county of Hartford, State of Connecticut, have invented certain new and useful Improvements in a Screw-Thread-Gauge Device, of which the following is a specification.

This invention relates to screw gauges and methods of measuring inaccuracies in screw threaded or serrated members.

One object of the invention is to provide a convenient form of gauge for measuring and determining the degree of inaccuracy in screw threaded or serrated members.

Another object of the invention is to provide an improved form of gauge by means of which the diameters of screw threaded members or the dimensions of serrated or toothed members may be quickly determined.

It is a further object to produce a gauge or measuring instrument of this type by which screw threaded members or the like, within a given range of diameter and having a similar thread pitch may be accurately, quickly and easily compared or measured with respect to a standard.

Another object of the invention is to provide an improved method of measuring inaccuracies in screw threaded members such as, for instance, gauging the lead and the amount of inaccuracies therein.

The invention, accordingly, consists in the features of construction, combination of elements and arrangement of parts and the steps of the method which will be exemplified in the construction and method hereinafter set forth, and the scope of the application of which will be indicated in the appended claims.

In the drawing forming a part of this specification, I have shown for illustrative purposes an embodiment of the invention which is particularly useful for gauging taps having an even number of flutes, for instance four, but it is to be understood that this is only one of many embodiments which the invention may take. In these drawings similar reference characters refer to similar parts:

Fig. 1 is an elevation of a gauge constructed in accordance with the features of this invention and particularly adapted to measure the diameter of thread cutting taps, portions of the structure being cut away to show the internal construction;

Fig. 2 is a plan view of the gauge shown in Fig. 1;

Fig. 3 is a view looking at serrated faces of one of the gauge members; and

Figs. 4 and 5 are diagrammatic views showing the manner in which inaccuracies in the lead may be determined.

Referring to the drawing, my improved construction consists generally of a base 10 having at one end a gauge member supporting block 11 and at the other end a support 12 for a micrometer 13 by means of which two gauge members 14 and 15 are moved with respect to each other and by which the amount of such movement may be very accurately measured.

The gauge members 14 and 15 are preferably adapted to lie in the same plane and in alinement with each other so that when a threaded, toothed or similar member such as a tap indicated at 16, is inserted therebetween, its teeth will register with the teeth of one of such gauge members, and when the other gauge member is brought up to position its teeth will also engage with the teeth of the tap. In order to provide clearance and room for the tap, the base 10 is suitably hollowed as at 17.

Preferably, I construct the gauge holding block 11 so as to hold the gauge 14 rigidly, and for this purpose there is provided a rod 20 which is pinned at 21 to the block 11. To accommodate the rod 20 a suitable hole 22 is provided in the base 10 extending from the seat 23 upon which the block 11 rests to the lower face of the base 10. In order to hold the block 11 solidly on its seat, there is provided a screw 24 threading into the rod 20 and engaging at its head on a suitable shoulder 25 in the base 10. Thus, when the screw 24 is tightened, the block 11 is held firmly on its seat.

The gauge member 14 is held from being lifted from the block 11 by means of a face plate 27 which may be fastened down onto the block by means of a pair of screws 28. The gauge member 14 is also held against turning in the block 11 by a rib 29 which is formed integrally with the gauge member and which cooperates with the groove 30 formed on the upper face of the block 11. Two screws 31 are threaded into the block 11 so that their heads lie in the path of the gauge member and limit its lateral movement. This permits sufficient sidewise motion of the gauge member to properly register the teeth thereof with the thread of the tap. There is also provided a means for angularly adjusting the block 11 to bring the edge of one gauge member into proper relation to the other. To this end, there are provided a pair of adjusting screws 32 which bear against the back face of the block 11 and by means of which the block may be rotated somewhat about the rod 20 as an axis.

The other gauge member 15 is slidable longitudinally in the direction of gauge member 14 in a slot 35 in the upper face of the base 10. It is held within this slot by means of a plate 36 which is fitted to the upper face of the base 10 and secured in this position by means of screws 37. In order to remove this face plate, there are provided key hole slots 38 which cooperate with the screws 37 so that, upon loosening of the latter, the face plate 26 may be moved longitudinally until the heads of the screws register with the larger part of the key hole slots 38, whereupon the plate 26 may be lifted from the base.

The micrometer 13 provides a means for indicating the spacing of the gauge blocks 14 and 15 and is of the usual type comprising a spindle 40 contacting with the rear face of the gauge member 15 and which is moved back and forth by means of a barrel 41 of the usual construction, the body of the micrometer, as well as the barrel, being suitably graduated as is usual. The body of the micrometer is slightly reduced at 42 and fits within a sleeve 43 by which it is tightly gripped. There is provided on the sleeve 43 a key way 44 to engage a pin or key 45 carried in the micrometer support 12 so that the sleeve 43 may be moved longitudinally but is prevented from turning. The sleeve 43 is slightly longer than the thickness of the micrometer support 12 and the projecting end thereof is threaded to receive a nut 46 by means of which the sleeve may be longitudinally adjusted in the support. The nut 46 is held against the face of the support by a thrust block 47 suitably secured to the support. The object of permitting longitudinal adjustment of the sleeve 43 in the support 12 is so that an initial adjustment of the micrometer and gauge blocks may be had. The object of making the sleeve non-rotatable is to provide an arrangement in which the indicating scale on the body of the micrometer will always face upwardly, so that in any position of adjustment of the micrometer this scale may be easily observed. Thus, if a threaded member of correct dimensions, for instance, a master plug, be inserted between the gauge members 14 and 15, an initial adjustment of the gauge members may be made by turning the nut 46 in the proper direction to slide the sleeve 43 backward or forward as the case may be. In making such an initial adjustment, the micrometer barrel should preferably be set so that the graduations read zero or some other suitable even number to eliminate unnecessary computation.

Owing to the fact that the thread of a screw diametrically on the opposite side is inclined in opposite directions, the serrations or teeth of one of the gauge members is inclined in one direction and those of the other gauge member are correspondingly inclined in the opposite direction.

It is to be understood that the pitch angle of a thread of a given lead on one thread member will be greater than the pitch angle of a thread of the same lead on a threaded member of larger diameter. For instance, the pitch angle of a thread on a one-half inch piece will be twice that of a thread of the same lead on a one inch diameter piece. In accordance with the present invention, I so arrange the serrations on the gauge members that measurements of taps or threaded members having the same lead and differing in diameter within certain limits, may be measured without using different gauge members. To this end, I make the angle of inclination of the serrations of the gauge members a mean between the two extreme pitch angles of the threaded members within the capacity of the gauge, so that these two extreme sizes and all intermediate sizes may be measured. This may be readily understood by referring to Fig. 3, wherein is shown a view looking at the serrated face of one of the gauge members. In this view, the line $a$—$a$ indicates the pitch angle of a thread of a one inch tap, for instance. The line $b$—$b$ indicates the pitch angle of a thread of a one-half inch tap.

It will be noted that the inclination of the teeth or serrations 14′ and the gauge member is a mean between the lines $a$—$a$ and $b$—$b$. While the teeth of neither a one inch nor a half inch tap will accurately fit in the grooves of the gauge members, they fit sufficiently close to allow accurate measurement thereof.

When a tap or the like is to be measured, the gauge member 15 is very accurately adjusted by means of the micrometer, so that the master plug that has a thread of exactly the same dimensions as those desired in the piece tested will just fit in between the gauge members. In making this adjustment, the sleeve 43 will be longitudinally adjusted so that the micrometer 13 will register at zero or other desired indicating mark. Thereafter, the micrometer barrel is rotated so as to bring the gauge member 15 in such relation to the opposed gauge member that the piece to be measured will just fit in between. The micrometer is then read, and the differnce between the final reading of the micrometer and the original or initial reading when the gauge plug was measured will indicate the inaccuracies in the tap.

The gauge above described may be used for measuring inaccuracies in the lead or pitch of a screw in the following manner. First, a screw or tap is placed between the gauge members 14 and 15 far enough to engage one thread only, the gauge blocks 14 and 15 are then brought together, and the screw diameter is measured for this position, the readings of the micrometer being noted. Then the screw is placed so that a greater number of threads are engaged by the gauge blocks 14 and 15, and a second reading of the micrometer is taken. Preferably, the screw should be placed so that the entire serrated face of each gauge member engages the thread of the screw being tested. If the lead of the screw is accurate, the second reading of the micrometer should be the same as the initial reading. However, in cases where the lead of the screw thread is not accurate, the sides of the teeth on the serrated faces of the gauge members will climb, so to speak, the sides of the first and last thread of the screw within the gauge, and the micrometer reading in this position will be greater than the initial reading. The greater the inaccuracy in lead, the greater will be the diameter indicated by the micrometer and, therefore, the gauge may be calibrated and the data thus obtained may be tabulated so as to indicate at a glance the inaccuracy in lead for an observed difference in initial and final micrometer readings taken as above described.

This will be more clearly understood by reference to Fig. 4 wherein 50 represents the screw and 51 the gauge member. As indicated, the lead of the screw is greater than it should be to properly engage the serrations of the gauge member. The screw and gauge member contact at the outside faces of the first and last serrations of the gauge. This is the "climbing" above referred to which results in an apparent diameter greater than its actual value. The same result is produced when the screw thread is of smaller lead than the gauge member. By referring to Fig. 5 it will be seen that there are only two threads of the screw 50' which contact with the opposed or inside faces of the serrations of the gauge member 51 causing the same result as in the case where the lead is too great.

Likewise, this gauge will disclose variations in diameter caused by incorrect inclination of the sides of the thread, since, if the side angle of the thread is too great, the serrations on the face of the gauge members 14 and 15 will not enter to the root of the thread of the piece being measured. Such an inaccuracy will be indicated by the difference in diameter of a standard thread or plug gauge and the test piece. This inaccuracy will also be apparent upon examination with a magnifying glass while the piece is between the gauge members.

As previously stated, the arrangement is such that the micrometer, as a whole, is not rotated and, therefore, the scale on the body of the micrometer is always in plain view. When passing a tap between the gauge members, the gauge member 14 may move laterally, owing to the inclination of the thread on the tap.

Thus, by the above construction, are accomplished, among others, the objects hereinbefore referred to.

As many changes could be made in the above construction and method and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A gauge device comprising, in combination, a base or frame, a pair of gauge members having opposed serrated faces, one of said gauge members being angularly adjustable about an axis generally parallel to the serrations, and one of said gauge members being movable towards and away from the other gauge member.

2. A gauge device comprising, in combination, a base or frame, a pair of gauge members having opposed serrated faces, one of said gauge members being angularly adjustable about an axis generally parallel to the serrations, and means for adjusting said gauge member and holding the same in adjusted position, one of said gauge members being movable towards and away from the other.

3. A gauge device comprising, in combination, a base or frame, a pair of gauge members having opposed serrated faces, one of said gauge members being angularly adjustable about an axis generally parallel to the serrations, means for adjusting said gauge member and holding it in adjusted position, one of said gauge members being movable towards and away from the other one, and means for determining the amount of movement of the last mentioned gauge member.

4. A gauge device comprising, in combination, a base, a pair of gauge members having opposed surfaces provided with serrations, the serrations of one gauge member being inclined relative to those of the other, one of said gauge members being angularly adjustable about an axis generally parallel to said serrations, and one of said gauge members being movable towards and away from the other gauge member.

5. A gauge device comprising, in combination, a base or frame, a pair of gauge members having opposed surfaces provided with serrations, the serrations of one gauge member being oppositely inclined relative to those of the other, one of said gauge members being angularly adjustable, means for adjusting said gauge member and holding the same in adjusted position, the other of said gauge members being movable towards and away from the first one, and means for so moving said other gauge member.

6. A gauge device comprising, in combination, a base, a pair of gauge members having opposed surfaces provided with serrations, the serrations of one gauge member being oppositely inclined relative to those of the other, one of said gauge members being angularly adjustable, means for adjusting said gauge member and holding it in adjusted position, one of said gauge members being movable towards and away from the other one, and means for determining the amount of movement of the last mentioned gauge member.

7. A gauge device comprising, in combination, a base, a pair of gauge members having opposed surfaces provided with serrations, the serrations of one gauge member being oppositely inclined relative to those of the other, one of said gauge members being angularly adjustable about an axis generally parallel to the serrations, one of said gauge members being movable towards and away from the other gauge member; and one, at least, of said members being mounted for lateral movement.

8. A gauge device comprising, in combination, a base, a pair of gauge members having opposed surfaces provided with serrations, the serrations of one gauge member being oppositely inclined relative to those of the other, one of said gauge members being angularly adjustable, means for adjusting said gauge member and holding it in adjusted position, one of said gauge members being movable towards and away from the other one, and means for determining the amount of movement of the last mentioned gauge member; one, at least, of said members being mounted for lateral movement.

9. A gauge device comprising, in combination, a base, a pair of serrated gauge members in a plane, a support for one of said gauge members, said support being mounted on said base and rotatable in said plane, and means to hold said support in a predetermined angular position with respect to said base, the other said gauge member being movable toward and away from said rotatable member.

10. A gauge device comprising, in combination, a base, a pair of serrated gauge members, and a support for one of said gauge members comprising a part extending into said base and secured thereto, said support being rotatable about the axis of said part, adjusting means to hold said support in a predetermined angular position with respect to said base, and means to secure said gauge member to said support, the other said gauge member being movable toward and away from said rotatable member.

11. A gauge device comprising, in combination, a base, a gauge member slidable longitudinally on said base, a micrometer cooperating with said slidable gauge member, and means for adjusting said micrometer and said gauge member to assume an initial position, said means comprising a non-rotatable sleeve supported by said base and fixed to said micrometer and means to move said sleeve longitudinally with respect to said base and to hold said sleeve in any desired position.

12. A gauge device comprising, in combination, a base, a gauge member slidable longitudinally on said base, a micrometer cooperating with said slidable gauge member and means for moving said micrometer and said gauge member with respect to said base, said means comprising a non-rotatable sleeve supported by said base and fixed to said micrometer and threaded at one end, and a nut held against said base and cooperating with the threaded portion of said sleeve to move said sleeve with respect to said base, whereby an initial setting of said gauge member and said micrometer may be obtained.

13. A gauge device comprising, in combination, a base, a pair of serrated gauge members, a support for one of said gauge members, said support being provided with a key-way therein, one of said gauge members being a projecting key on one of its faces to cooperate with said key-way, and a retaining plate mounted on said support to hold said gauge member thereon.

14. A gauge device comprising, in combination, a pair of serrated gauge members, a support for one of said gauge members and provided with a key-way, a projecting key on a face of one of said gauge members cooperative with the key-way in said support to permit lateral motion of said gauge member, and a pair of screws projecting in the path of said gauge member to limit the lateral movement thereof.

15. A gauge device comprising, in combination, a base, a pair of gauge members having opposed serrated faces and adapted to receive therebetween threaded members of various diameters of a pitch corresponding to the spacing of the serrations on said gauge members, said serrations on the gauge members having a pitch angle which is a mean between the extreme pitch angles of the threaded members adapted to be received between said gauge members.

16. A gauge device comprising, in combination, a base, a pair of gauge members supported horizontally on said base and having opposed serrated faces, a micrometer to move one of said gauge members toward and away from the other said gauge member, means for adjusting said micrometer and said gauge member to assume an initial position, and means to maintain the graduations of said micrometer facing upwardly.

BENGT M. W. HANSON.